US006993049B2

(12) United States Patent
Davies

(10) Patent No.: US 6,993,049 B2
(45) Date of Patent: *Jan. 31, 2006

(54) COMMUNICATION SYSTEM

(75) Inventor: Robert J. Davies, Horley (GB)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 635 days.

This patent is subject to a terminal disclaimer.

(21) Appl. No.: 09/876,514

(22) Filed: Jun. 7, 2001

(65) Prior Publication Data

US 2002/0028657 A1    Mar. 7, 2002

(30) Foreign Application Priority Data

Jun. 26, 2000  (GB) .................................. 0015454
Aug. 15, 2000  (GB) .................................. 0020076

(51) Int. Cl.
*H04J 3/12*    (2006.01)
*H04J 3/16*    (2006.01)
*H04L 12/403*  (2006.01)

(52) U.S. Cl. ...................... 370/528; 370/346; 370/449; 370/465

(58) Field of Classification Search ................ 370/311, 370/312, 328–330, 336, 337, 346, 347, 350, 370/390, 465, 470, 473, 476, 491, 528, 449
See application file for complete search history.

(56) References Cited

U.S. PATENT DOCUMENTS 4,766,434 A  * 8/1988  Matai et al. ................ 340/7.55
6,574,266 B1 * 6/2003  Haartsen .................... 375/133
6,664,891 B2 * 12/2003  Davies et al. ............... 340/505

* cited by examiner

*Primary Examiner*—Chi Pham
*Assistant Examiner*—Ronald Abelson

(57) ABSTRACT

A communications system comprises a primary station (100) and at least one secondary station (101). The primary station (100) is arranged to broadcast a series of inquiry messages, each in the form of a plurality of predetermined data fields arranged according to a first communications protocol such as Bluetooth. In addition the primary station (100) adds to some or all of the inquiry messages an additional data field for polling one or more secondary stations, which can respond to the poll if they have data for transmission. This system provides secondary stations (101) with a rapid response time without the need for a permanently active communication link.

12 Claims, 3 Drawing Sheets

FIG. 3
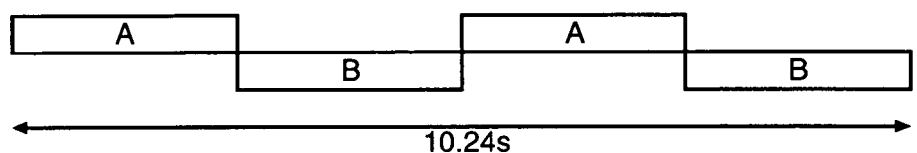
FIG. 4
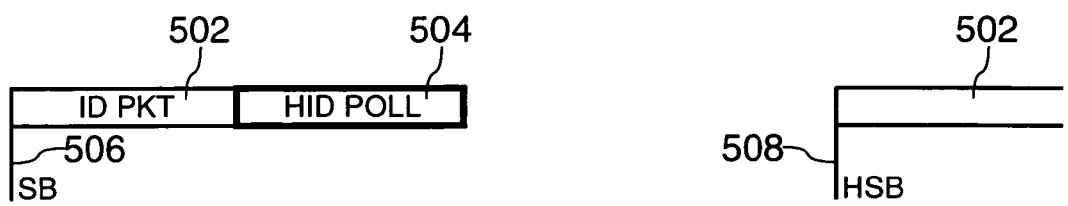
FIG. 5

COMMUNICATION SYSTEM

The present invention relates to a communication system and further relates to primary and secondary stations for use in such a system and to a method of operating such a system. Although the present invention is described with particular reference to a Bluetooth system, it is applicable to a range of other communication systems.

In recent years there has been increasing interest in enabling devices to interact via wireless communication links, thereby avoiding the need for extensive cabling. An example of a communication system which may be used for such wireless links is a Bluetooth network, operating according to the specification defined by the Bluetooth Special Interest Group. Such a network is intended to provide low-cost, short range radio links between mobile PCs, mobile phones and other devices, whether portable or not.

Communication in a Bluetooth network takes place in the unlicensed ISM band at around 2.45 GHz. Stations form ad-hoc networks which are known as piconets, each comprising a master station and up to seven slave stations. All stations are identical and capable of acting as master or slave as required. A station can take part in more than one piconet, thereby linking piconets and enabling communication over an extended range.

One application for which use of Bluetooth is proposed is the connection of controller devices to host systems. A controller device, also known as a Human/machine Interface Device (HID), is an input device such as a keyboard, mouse, games controller, graphics pad or the like. Such HIDs do not typically require a link having high data throughput, but do require a very responsive link.

A Bluetooth system is more than capable of supporting the throughput requirements of HIDs. However, the degree of responsiveness required can be more difficult to achieve. An active Bluetooth link can offer a reasonably responsive service, but this requires both setting up of the link and its maintenance even during periods of inactivity.

Two types of communication link supported in a Bluetooth network are Asynchronous ConnectionLess (ACL) links and Synchronous Connection Oriented (SCO) links. ACL links allow slaves to enter a 'park' mode and cease active communications, which also allows a number of other HIDs to maintain links with the master station without violating the Bluetooth rule that no more than seven slaves can be active at any one time. A slave has to be polled before it can submit a request to leave park mode and become active. SCO links require continuous operation by a slave, but there are only a limited number of SCO channels available.

Setting up a link requires a HID to join, as a slave, the piconet including the host system (which will typically act as piconet master, i.e. a base station). Joining the piconet requires two sets of procedures, namely 'inquiry' and 'page'. Inquiry allows a would-be slave to find a base station and issue a request to join the piconet. Page allows a base station to invite slaves of its choice to join the net. Analysis of these procedures indicates that the time taken to join a piconet and then to be in a position to transfer user input to the master could be several tens of seconds.

It is possible for this procedure to be carried out once and for all when the host system is turned on. However, HIDs will normally be battery operated and it is therefore not acceptable for them to have to remain permanently switched on. In particular, for a HID to sign on to the piconet automatically when the host system is turned on it will either have to be regularly waking up to look for Bluetooth inquiry bursts, thereby consuming power, or it will need to be manually woken up by the user.

It is therefore more likely that a HID will remain inactive until it is woken up, either by being explicitly switched on or by a user attempting some form of input. Hence, the host system's Bluetooth master will need to run inquiry cycles periodically, which has two implications. The first is that because the inquiry phase is periodic rather than continuous, initial access time could be several tens of seconds. This could mean that it could take half a minute or more from the time a user moves a mouse to a cursor moving on a screen. Secondly, the fact that an inquiry cycle takes place at all means that ACL links will be suspended during this cycle, for up to 10.24 seconds at a time. Although SCO links could be used, a HID using such a link could not cease transmissions during inactive periods.

It is therefore an object of the invention to address the problem of providing a responsive link between a HID and a host system which allows the HID to go to sleep during periods of inactivity.

According to a first aspect of the present invention there is provided a communications system comprising a primary station and at least one secondary station, wherein the primary station has means for broadcasting a series of inquiry messages, each in the form of a plurality of predetermined data fields arranged according to a first communications protocol, and means for adding to an inquiry message prior to transmission an additional data field for polling at least one secondary station, and wherein the or each polled secondary station has means for determining when an additional data field has been added to the plurality of data fields, for determining whether it has been polled from the additional data field and for responding to a poll when it has data for transmission to the primary station.

According to a second aspect of the present invention there is provided a primary station for use in a communications system comprising at least one secondary station, wherein means are provided for broadcasting a series of inquiry messages, each in the form of a plurality of predetermined data fields arranged according to a first communications protocol, and for adding to each inquiry message prior to transmission an additional data field for polling at least one secondary station.

According to a third aspect of the present invention there is provided a secondary station for use in a communications system comprising a primary station, wherein means are provided for receiving an inquiry message broadcast by the primary station, the message being in the form of a plurality of predetermined data fields arranged according to a first communications protocol and having added to it an additional data field for polling at least one secondary station, and wherein means are provided for determining when an additional data field has been added to the plurality of data fields, for determining whether it has been polled from the additional data field and for responding to a poll when it has data for transmission to the primary station.

According to a fourth aspect of the present invention there is provided a method of operating a communication system comprising a primary station and at least one secondary station, the method comprising the primary station broadcasting a series of inquiry messages, each in the form of a plurality of predetermined data fields arranged according to a first communications protocol, and adding to an inquiry message prior to transmission an additional data field for polling at least one secondary station, and further comprising the or each polled secondary station determining when an additional data field has been added to the plurality of data fields, determining whether it has been polled from the additional data field and responding to a poll when it has data for transmission to the primary station.

Embodiments of the present invention will now be described, by way of example, with reference to the accompanying drawings, wherein:

FIG. 3 is a chart illustrating the transmission of a train of inquiry access codes centred on a given frequency;

FIG. 4 illustrates alternation between trains of inquiry messages over the duration of an inquiry broadcast;

FIG. 5 illustrates the insertion of a packet of broadcast data within an existing transmission slot.

In the drawings the same reference numerals have been used to indicate corresponding features.

In the following description we consider particularly a system which utilises Bluetooth protocols for communication of messages between stations. As will be recognised, the general invention concept of polling HIDs via a broadcast channel used as part of the inquiry procedure is not restricted to Bluetooth devices and is applicable to other communications arrangements, in particular frequency hopping systems.

Figure 1:
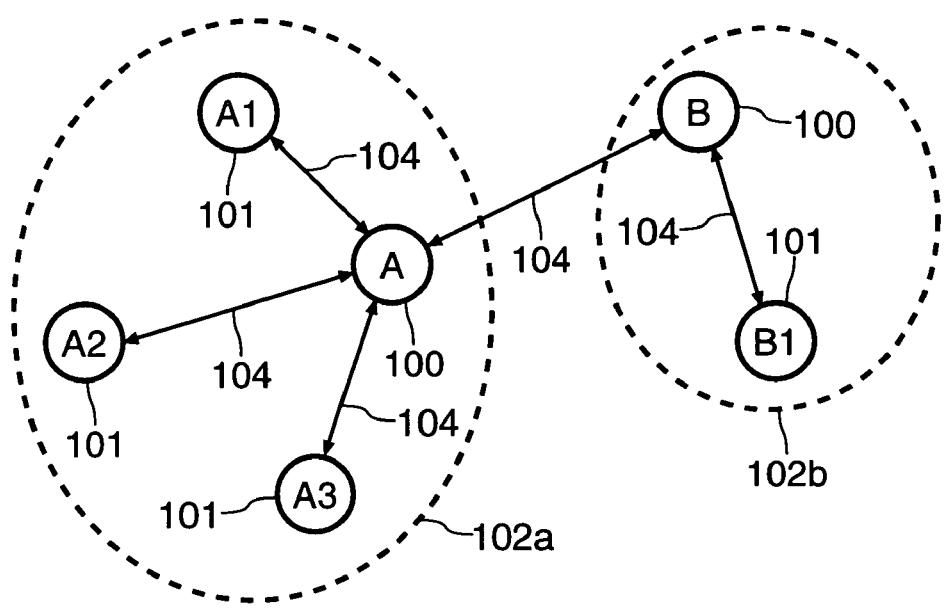
FIG. 1 is a diagram of an ad-hoc wireless network comprising two linked piconets.

A basic Bluetooth network configuration is illustrated in FIG. 1. Such a configuration would typically begin with two connected host devices, for example a portable PC and a cellular phone, and grow to include additional connected devices. A wide range of additional host devices may be included, for example wireless headsets, personal organisers and home entertainment equipment. The network comprises a plurality of stations 100, 101 each included in such a host device, formed into two piconets 102a, 102b. In general the networking components (i.e. the Bluetooth chip for a Bluetooth network) of all stations 100, 101 will be implemented identically. However, it is only necessary that all stations 100, 101 comprising the network are able to operate according to a compatible protocol.

The first piconet 102a is a point-to-multipoint network comprising four stations 100, a master 100(A) and three slaves 101(A1,A2,A3), with bidirectional communication channels 104 between the master 100 and each of the slaves 101. The second piconet 102b is a point-to-point network comprising a master 100(B) and a slave 101(B1). Communication between the piconets 102a, 102b is enabled by the master A in the first piconet 102a also acting as a slave in the second piconet 102b and vice versa. It is not necessary for the link between the piconets 102a, 102b to be between masters: it would be equally possible for the link to be between stations A3 and B1 or between A and B1, for example.

Figure 2:
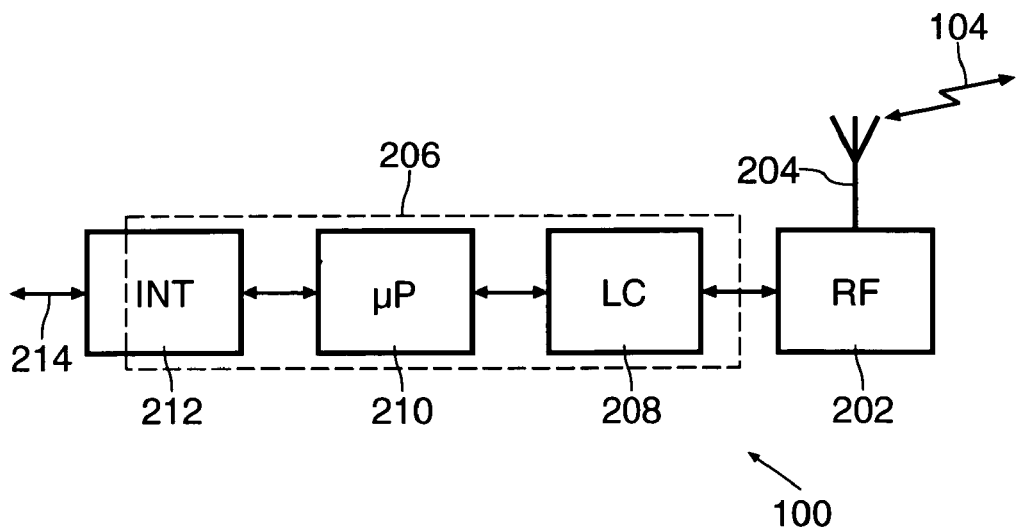
FIG. 2 is a block schematic diagram of a typical Bluetooth station.

An example of a station 100 for use in a Bluetooth system is illustrated in more detail in FIG. 2, and comprises two main sections. The first section is an analogue unit comprising a radio (RF) 202 having an antenna 204 for transmitting and receiving radio signals on the communication channel 104. The second section is a digital controller unit 206, further comprising a link baseband controller (LC) 208, a microprocessor (μP) 210 and an interface unit (INT) 212.

The link controller 208 comprises means for performing baseband processing and execution of basic protocols close to the physical layer, for example implementing error correction coding, generating Automatic Repeat reQuests (ARQ) and performing audio coding. The microprocessor 210 manages the station 100, controlling data transfer between the interface unit 212 and the link controller 208. The interface unit 212 comprises hardware and software for interfacing the station 100 to a host device such as a portable PC or a cellular phone. The interfacing is performed via a link 214, which might include interfaces to a USB (Universal Serial Bus), external memory and other items as appropriate for the particular application.

The Bluetooth inquiry procedure allows a would-be slave 101 to find a base station and issue a request to join its piconet. It has been proposed specifically to overcome problems caused by the frequency-hopping nature of Bluetooth and similar systems. The applicants have recognised that it is possible to piggy-back a broadcast channel on the inquiry messages issued by the master 100. The broadcast channel can be used to poll HIDs at regular intervals. However, at the air interface, the mechanism is entirely compatible with conventional Bluetooth systems.

To illustrate how this is implemented, we first consider how the Inquiry procedures themselves operate, with reference to FIGS. 3 and 4. When a Bluetooth unit wants to discover other Bluetooth devices, it enters a so-called inquiry substate. In this mode, it issues an inquiry message containing a General Inquiry Access Code (GIAC) or a number of optional Dedicated Inquiry Access Codes (DIAC). This message is repeated at several levels; first, it is repeated in a train A of 16 frequencies from a total of 32 making up the inquiry hopping sequence. The message is sent twice on two frequencies in even timeslots with the following, odd timeslots used to listen for replies on the two corresponding inquiry response hopping frequencies. Sixteen frequencies and their response counterparts can therefore be covered in 16 timeslots, or 10 ms. The chart of FIG. 3 illustrates the transmission of a single train on sixteen frequencies centred around f{k}, where f{k} represents the inquiry hopping sequence.

The next step is the repetition of the train a plurality of times. At the very least, as presently specified, this means 256 repetitions of the entire train. Finally, the train A is swapped for the train B consisting of the remaining 16 frequencies and the cycle repeated. As shown by FIG. 4, the specification states that this switch must occur at least three times to ensure the collection of all responses in an error-free environment. This means that an inquiry broadcast could take at least 10.24 seconds.

A portable device that wants to be discovered by a Bluetooth master 100 enters the inquiry scan substate. Here, it listens for a message containing the GIAC or DIACs of interest. It, too, operates in a cyclic way. It listens on a single hop frequency for an inquiry scan period which is long enough to cover the 16 inquiry frequencies used by the inquiry. On hearing an inquiry containing an appropriate IAC, the portable device enters a so-called inquiry response substate and issues a number of inquiry response messages to the master 100. The master 100 will then page the portable device, inviting it to join the piconet.

As mentioned above and shown in FIG. 5, the applicants propose that the inquiry messages issued by the base station have an extra field 504 appended to them, capable of carrying a HID poll message. The extended field 504 may carry a header that signifies a HID poll to distinguish it from other applications of extended field information, such as context-aware services or broadcast audio (as disclosed in our co-pending United Kingdom patent applications 0015454.2 (applicant's reference PHGB 000084) and 0015453.4 (applicant's reference PHGB 000085) respectively). It will also carry the address of the HID being polled, and may also carry a small amount of information to the HID which might be used to provide supplementary information to a user (such as text on an LCD screen) or feedback (for example, motional feedback in games controllers). By adding the field to the end of the inquiry message, it will be appreciated that non-HID receivers can ignore it without modification. In addition, by using a special DIAC to signify a HID poll, HID devices can be alerted to the presence of the forthcoming poll.

The presence of the extra data field 504 means that the guard space conventionally allowed at the end of a Bluetooth inquiry packet is reduced. However, this space is provided to give a frequency synthesiser time to change to a new hop frequency and will be generally unused otherwise, as current frequency synthesisers are capable of switching at speeds which do not need extension into the extra guard space. The standard inquiry packet is an ID packet (ID PKT) 502 of length 68 bits. Since it is sent in a half-slot, starting either on a slot boundary (SB) 506 or a half-slot boundary (HSB) 508, the guard space allocated is $(625/2-68)=244.5$ $\mu$s ($625$ $\mu$s slot period, 1 Mbit/s signalling rate). Modern synthesisers can switch in much less time with figures of 100 $\mu$s or lower considered routine by experts in the field. Hence a suitable size for the extra data field 504 could be 100 bits.

In a typical embodiment, four of the 100 bits will be lost as trailer bits for the ID packet 502: this is a consequence of it being read by a correlator. Of the 96 bits remaining, applicant's preferred allocation is for 64 bits to be used as data and 32 bits as a 2/3 FEC (Forward Error Correction) checksum. Each inquiry burst thus contains 8 bytes of broadcast data, allowing space for several channels of key coded or digitised analogue inputs.

In order to achieve the desired responsiveness, and because the HID has been specifically addressed, the HID is allowed to respond, if desired, in the next-but-one half-slot with a packet of similar format, containing information corresponding to the user's input. As described above, the inquiry procedure involves the transmission of two sets of sixteen frequencies in trains of inquiry transmissions. The 16 frequencies used within a train can be considered as 16 polling channels, and therefore 16 devices can be polled every 10 ms if desired. Other arrangements are possible, for example polling up to 32 devices every 20 ms or up to 8 devices every 5 ms. The arrangement of polling channels could also be flexible, with more rapid polling provided for devices which need a faster response time and vice versa.

Each device need only monitor a single frequency within a train, but must be able to track the train switches and frequency changes due to changing clock phase. It is assumed that an initial set up procedure synchronises the HID Bluetooth slave 101 to the Bluetooth master 100, as well as establishing the nature of the HID and the format it uses for uplink and downlink transmissions. At this time the HID is allocated a device address and a channel number corresponding to one of the sixteen channels within a train.

For fast polling, it is necessary for the Bluetooth master 100 to operate continuously. This interferes with the conventional mechanism for setting up two-way links. However, use of two radios operating in tandem, as disclosed in our co-pending United Kingdom patent application 0015452.6 (applicant's reference PHGB 000086), avoids this problem, thereby enabling the provision of fast access to the piconet and an unlimited two-way throughput capacity.

By polling every 10 ms, with eight bytes per poll, a capacity of 800 bytes per second for sixteen devices is provided. In variations on the basic scheme described above this capacity could be lowered to permit the operation of conventional inquiry procedures, or to increase the number of HIDs that a host system 100 can support beyond sixteen.

In order to minimise their power consumption, HIDs are not obliged to respond to every poll if they have no information to offer. A watchdog timer could be provided in a HID to make it transmit at least once in a given period whilst it is nominally active. The period could for example be predetermined, determined by the host system or determined by negotiation between the host and each HID. HIDs failing to transmit within the determined period would then be removed from the master's list of active devices.

Figure 6:
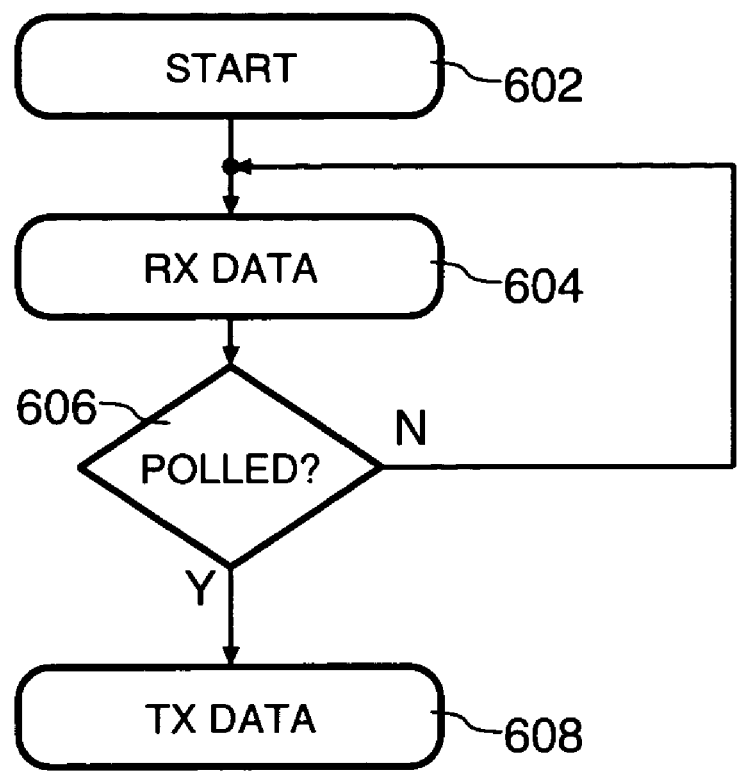
FIG. 6 is a flow chart illustrating a method of polling a HID in accordance with the present invention.

A method of polling a HID in accordance with the present invention is summarised in FIG. 6. The method starts, at step 602, when the HID has data to transmit to the host system. The HID receives, at step 604, data from the extra field 504 then tests, at step 606, whether it has been polled by the host system. If it has not been polled, the HID returns to step 604 to receive the next extra field 504. If the HID has been polled, it transmits its data in the next-but-one half-slot, at step 608.

Since an inquiry mode is necessary to permit access to the host system's piconet, it must be provided in the conventional manner for at least some of the time. There are a range of strategies which may be employed.

A first strategy involves the operation of one radio in two modes, namely set up and polling. In set up mode the inquiry procedure operates as normal and the HIDs can establish contact with the host master 100 in the conventional manner. Once all HIDs have established themselves, the master radio switches to polling mode, in which the inquiry procedure now operates in polling mode only. This strategy is ideal for games machines since it achieves the fastest response when polling mode is operational, while opportunities for other controllers to join the piconet occur at well-defined times, such as between games.

A second strategy is more appropriate when the host system is a general purpose device, such as a PC, in which case opportunities must be provided for new devices to join at any time. In this case the master's radio can operate in modeless fashion, devoting some of its time to fast polling and other times to conventional inquiry operations. Alternate 10 ms periods could be devoted to each operation to achieve a 50:50 ratio for example, with the ratio being able to be modified as desired. Such a system would still have a quick response to HIDs and the general inquiry operation, although possibly slower, would still operate as normal. The use of a special DIAC in a polling message should ensure that a slave 101 going through normal inquiry response procedures will not send an inquiry response packet in the space reserved for a fast poll response.

Allowing conventional inquiries in parallel with fast polling implies that, occasionally, there will be a slight pause in inquiry or fast polling to allow a new HID access to the host. This will probably not matter to the user since he will no longer be using old HIDs and will therefore not be aware of the temporary loss in responsiveness.

A third strategy is required when conventional Bluetooth data (or other) links are required, so as to support both a fast response for the polling mechanism and the data carrying capacity of conventional Bluetooth. This requires the use of two radios, and the approach disclosed in our co-pending United Kingdom patent application 0015452.6 (applicant's reference PHGB 000086) can also be used here. Alternatively, one radio could operate as a conventional Bluetooth radio with the other permanently dedicated to fast polling.

From reading the present disclosure, other modifications will be apparent to persons skilled in the art. Such modifications may involve other features which are already known in the design, manufacture and use of fixed and portable communications systems and component parts thereof, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

In the present specification and claims the word "a" or "an" preceding an element does not exclude the presence of a plurality of such elements. Further, the word "comprising" does not exclude the presence of other elements or steps than those listed.

What is claimed is:

1. A communications system comprising a primary station and at least one secondary station, wherein the primary station has means for broadcasting a series of inquiry messages, each in the form of a plurality of predetermined data fields arranged according to a first communications protocol, and means for adding to an inquiry message prior to transmission an additional data field for polling at least one secondary station, and wherein the at least one polled secondary station has means for determining when an additional data field has been added to the plurality of data fields, for determining whether it has been polled from the additional data field and for responding to a poll when it has data for transmission to the primary station.

2. A primary station for use in a communications system comprising at least one secondary station, wherein means are provided for broadcasting a series of inquiry messages, each in the form of a plurality of predetermined data fields arranged according to a first communications protocol, and for adding to each inquiry message prior to transmission an additional data field for polling at least one secondary station.

3. The primary station of claim 2, wherein means are provided for adding the additional data field at the end of a respective inquiry message.

4. The primary station of claim 2, wherein means are provided for including an indication in one of the predetermined data fields, the indication denoting the presence of the additional data field.

5. The primary station of claim 2, wherein the first communications protocol comprises Bluetooth messaging.

6. The primary station of claim 2, wherein the additional data field comprises at least 64 bits of data.

7. The primary station of claim 2, wherein first radio means are provided for broadcasting substantially continuously inquiry messages having the additional data field and second radio means are provided for handling other aspects of communication links with secondary stations.

8. A secondary station for use in a communications system comprising a primary station, wherein means are provided for receiving an inquiry message broadcast by the primary station, the message being in the form of a plurality of predetermined data fields arranged according to a first communications protocol and having added to it an additional data field for polling at least one secondary station, and wherein means are provided for determining when an additional data field has been added to the plurality of data fields, for determining whether it has been polled from the additional data field and for responding to a poll when it has data for transmission to the primary station.

9. The secondary station of claim 8, wherein the first communications protocol comprises Bluetooth messaging.

10. The secondary station of claim 8, wherein means are provided for responding to a poll after a predetermined interval has passed without transmission of data, whether or not the secondary station has data for transmission.

11. A method of operating a communication system comprising a primary station and at least one secondary station, the method comprising the primary station broadcasting a series of inquiry messages, each in the form of a plurality of predetermined data fields arranged according to a first communications protocol, and adding to an inquiry message prior to transmission an additional data field for polling at least one secondary station, and further comprising the at least one polled secondary station determining when an additional data field has been added to the plurality of data fields, determining whether it has been polled from the additional data field and responding to a poll when it has data for transmission to the primary station.

12. The method of claim 11, wherein not all inquiry messages have an additional data field for polling a secondary station added to them.

* * * * *